UNITED STATES PATENT OFFICE.

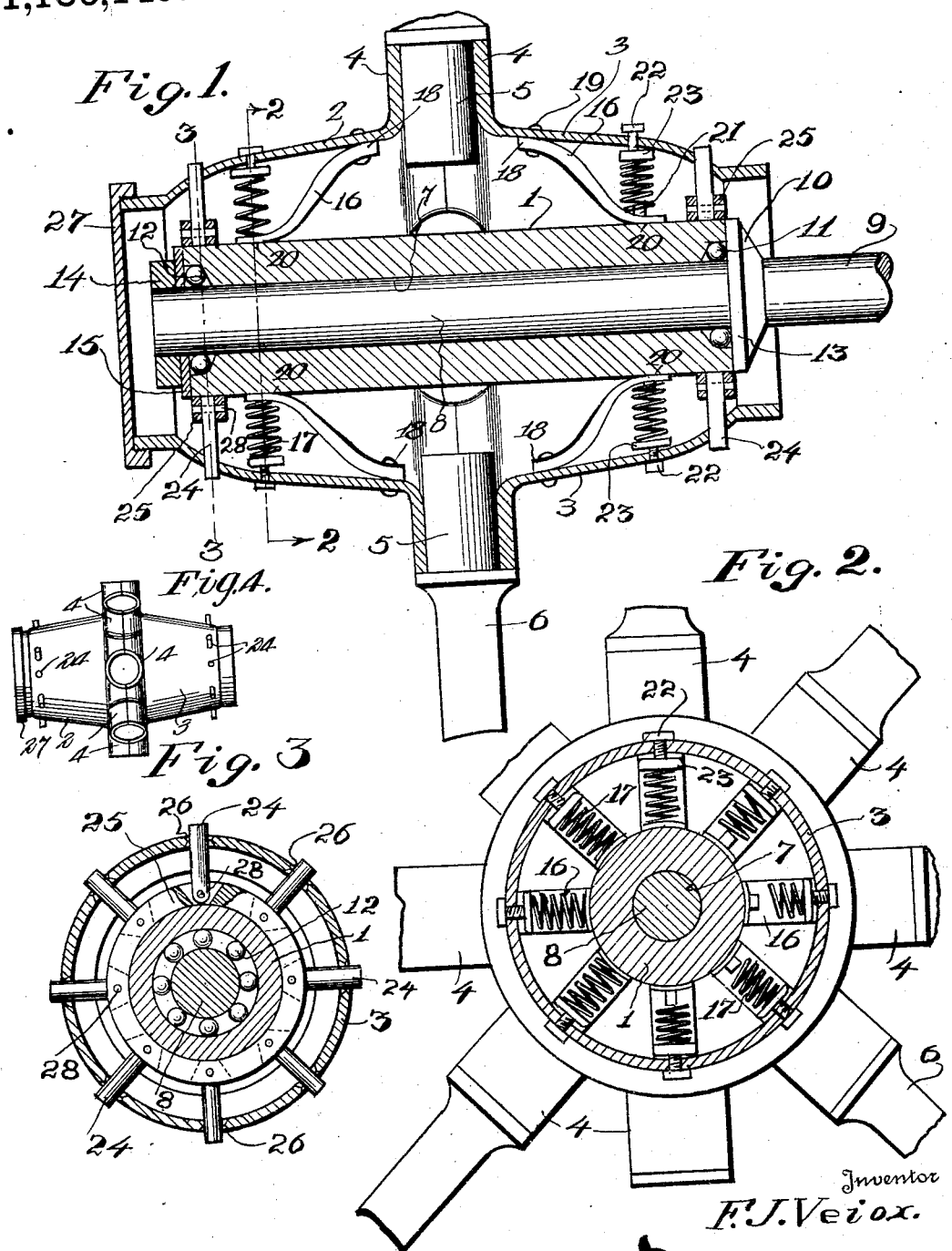

FRANK J. VEIOX, OF WARNER, SOUTH DAKOTA.

SPRING-HUB.

1,186,149.  Specification of Letters Patent.  Patented June 6, 1916.

Application filed June 23, 1915. Serial No. 35,869.

*To all whom it may concern:*

Be it known that I, FRANK J. VEIOX, a citizen of the United States of America, residing at Warner, in the county of Brown and State of South Dakota, have invented certain new and useful Improvements in Spring-Hubs; and I do hereby declare the following to be a full, clear, and exact description of the invention, such as will enable others skilled in the art to which it appertains to make and use the same.

The invention relates to improvements in resilient wheels.

The object of the present invention is to improve the construction of resilient wheels and to provide a brake hub of simple, practical and comparatively inexpensive construction designed for use on automobile wheels, motor trucks and similar vehicles and adapted to dispense with pneumatic tires by affording the resiliency of the same and capable of enabling solid rubber tires and tires of any other type to be employed on such wheels.

With these and other objects in view the invention consists in the construction and novel combination and arrangement of parts hereinafter fully described, illustrated in the accompanying drawings and pointed out in the claims hereto appended, it being understood that various changes in the form, proportion and minor details of construction may be resorted to without departing from the spirit or sacrificing any of the advantages of the invention.

In the drawing Figure 1 is a longitudinal sectional view of a hub constructed in accordance with this invention, Fig. 2 is a transverse sectional view on the line 2—2 of Fig. 1, Fig. 3 is a similar view on the line 3—3 of Fig. 1, Fig. 4 is a plan view of the hub on a reduced scale.

Like numerals designate corresponding parts in all the figures of the drawing.

In the accompanying drawing in which is illustrated the preferred embodiment of the invention the resilient or spring hub comprises in its construction an axle box 1 and front and rear metallic shells or sections 2 and 3 provided at their adjacent ends with attaching flanges 4 between which are secured the inner ends 5 of spokes 6. The attaching flanges 4 are arranged in parallelism and are secured to the spokes by any suitable fastening devices and they may be of any desired configuration to provide a solid support for the spokes. The axle box 1 which is cylindrical is provided with a bore or longitudinal opening 7 receiving the spindle 8 of an axle 9 and enlarged at its end 10 to form recesses for the reception of anti-friction balls 11 and 12 which are arranged contiguous to the collar 13 of the axle and to the axle nut 14, a washer 15 being interposed between the axle nuts and the adjacent end of the axle box. The anti-friction balls may be arranged in any other desired manner and any preferred form of ball bearing or roller bearing may be employed.

The inner and outer portions of the hub are cushioned by leaf springs 16 and coiled springs 17. The springs 16 which may be constructed of any suitable material are substantially S-shaped and are secured at their inner ends 18 by rivets 19 or other suitable fastening devices to the shells 2 and 3 at the inner faces thereof and the outer ends 20 of the springs 16 fit loosely against the axle box. The leaf springs 16 are shown extending longitudinally of the hub but they may be arranged in any other desired manner, and while the inner ends 18 of the springs are shown attached to the shells 2 and 3 either end of the springs may be made slidable as will be readily understood. The inner ends 18 are located adjacent to the attaching flanges and the loose outer ends are provided with projecting studs 21, fitting in the inner ends of the coiled springs 17. The coiled springs 17 which are interposed between the axle box and the shells 2 and 3 are connected with the latter by screws 22 carrying caps 23 fitting over the outer ends of the springs and securely maintaining the same in proper position. Also the screws provide for adjusting the springs to control the tension thereof to secure the desired cushioning action. Any other suitable means, however, may be employed for connecting the springs with the shells or sections 2 and 3. The inner ends of the springs 17 which are seated upon the loose ends of the other springs 16 are carried by the same in the movement thereof.

In order to limit any relative rotary movement of the inner and outer sections or portions of the hub, the axle box, or inner portion of the hub is provided with radially arranged studs 24 pivotally mounted on rings 25 and projecting through tapered openings 26 in the shells or sections 2 and 3.

The rings or bands 25 are designed to be rigidly secured to the axle box in any suitable manner and the studs or projections may be secured by removable pins 28 or otherwise connected with the said rings or bands to facilitate the ready assembling of the parts.

The outer shell 3 of the hub is shown provided with an end cap 27 but the hub may be constructed in any desired manner and any suitable means may be employed for excluding dust and dirt from the interior of the hub. The spaced inner and outer portions of the hub and the interposed cushioning means provide a resilient or spring hub which is adapted to obviate the necessity of using pneumatic tires on vehicle wheels and the projections 24 hold the inner and outer portions of the hub against relative longitudinal circumferential movement.

What is claimed is:—

1. A spring hub of the class described comprising spaced inner and outer portions, and interposed cushioning means consisting of leaf springs secured to one of the parts and having a slidable bearing against the other part and coiled springs mounted on the slidable portions of the leaf springs and interposed between the inner and outer portions of the hub.

2. A spring hub of the class described including spaced inner and outer portions, curved springs interposed between the inner and outer portions of the hub and secured to the outer portion and having a slidable bearing against the inner portion and provided with projecting studs, coiled springs seated upon the slidable portions of the said springs and engaging the said studs and interposed between the inner and outer portions of the hub, and means carried by the outer portion of the hub and adjustably engaging the coiled springs for holding the same in position and for varying the tension thereof.

3. A spring hub of the class described comprising an axle box having bearings, inner and outer shells spaced from the axle box and provided at their proximate ends with flanges, spokes arranged between the flanges of the said inner and outer shells, leaf springs interposed between the axle box and the said shells and secured at one end to the shells and slidable on the axle box at their other ends, coiled springs interposed between the slidable ends of the leaf springs and the said shells and bands mounted on the axle box at the ends thereof and provided with radially projecting means slidably connected with the shells for limiting the relative movement of the inner and outer portions of the hub.

In testimony whereof I affix my signature in presence of two witnesses.

FRANK J. VEIOX

Witnesses:
 A. D. REHFELD,
 HENRY SWANSON.

Copies of this patent may be obtained for five cents each, by addressing the "Commissioner of Patents, Washington, D. C."